US006618582B1

United States Patent
Coons et al.

(10) Patent No.: US 6,618,582 B1
(45) Date of Patent: Sep. 9, 2003

(54) CUSTOMER SERVICE SYSTEM WITH FEEDBACK AND METHOD FOR OPERATING

(76) Inventors: Benton Sill Coons, 19185 Edgewood La., Prior Lake, MN (US) 55372; Kenneth James Coons, 1782 Marshall Ave., St. Paul, MN (US) 55104

( * ) Notice: Subject to any disclaimer, the term of this patent is extended or adjusted under 35 U.S.C. 154(b) by 0 days.

(21) Appl. No.: 09/115,988

(22) Filed: Jul. 15, 1998

(51) Int. Cl.[7] .............................................. H04Q 7/20
(52) U.S. Cl. ...................... 455/404; 455/521; 455/677
(58) Field of Search .............................. 455/404, 521, 455/90, 128, 7, 62, 38.1, 38.2, 38.4, 67.1, 67.7, 115; 340/539, 825.37, 825.44, 311.1, 287; 379/67.1, 37

(56) References Cited

U.S. PATENT DOCUMENTS

| | | | |
|---|---|---|---|
| 3,553,383 A | | 1/1971 | Rochtus ....................... 379/217 |
| 3,767,859 A | | 10/1973 | Doering et al. ......... 379/106.02 |
| 3,824,560 A | | 7/1974 | Vitolo et al. .................... 705/2 |
| 4,023,139 A | | 5/1977 | Samburg .................... 340/506 |
| 4,225,852 A | | 9/1980 | Waters et al. ........... 340/286.07 |
| 4,298,863 A | | 11/1981 | Natitus et al. ............ 340/573.1 |
| 4,724,538 A | | 2/1988 | Farrell ........................ 455/404 |
| 4,741,020 A | | 4/1988 | Deal et al. ............. 340/311.1 X |
| 5,086,385 A | * | 2/1992 | Launey et al. ...... 340/825.37 X |
| 5,093,924 A | * | 3/1992 | Toshiyuki et al. ......... 455/62 X |
| 5,134,644 A | * | 7/1992 | Garton et al. ........... 340/539 X |
| 5,377,256 A | | 12/1994 | Frnaklin et al. ............. 455/404 |
| 5,576,689 A | * | 11/1996 | Queen .................... 340/539 X |
| 5,686,886 A | * | 11/1997 | Stensney .................... 340/539 |
| 5,701,338 A | * | 12/1997 | Leyen et al. ............. 379/37 X |
| 6,060,979 A | * | 5/2000 | Eichsteadt ................... 340/287 |

FOREIGN PATENT DOCUMENTS

GB     2 283 604     5/1995

OTHER PUBLICATIONS

Control Technology, Inc., Company Profile, CTI Data Messenger Home—Monitoring & Control, Controller Descriptions, Pricing, Applications Overview and Product Accessories Descriptions, 12 pages (Apr. 10, 1998).

Johnson™ Data Telemetry, Synthesized DL–3412/DL–3422 and DL–3492 High Spec Telemetry Links brochure, 4 pages, ©Copyright 1997 Johnson Data Telemetry Corporation.

INOVONICS High Performance Wireless®, 1998 Product Catalog, 24 pages (1998).

INOVONICS High Performance Wireless, FA525 Frequency Agile™ 900MHz Intelligent Repeater with SST™, User Manual, pp. 1–12, © 1997 INOVONICS Corporation.

INOVONICS, FA403 Overview, System Options and Installation, 4 pages, © 1997 INOVONICS Corporation.

"Enhancing the Target Guest Experience: Advanced Wireless Communications' Proposal for improving Guest Help Response Time" Jun. 26, 1997, offer for sale.

\* cited by examiner

*Primary Examiner*—Nay Maung
*Assistant Examiner*—Philip J. Sobutka
(74) *Attorney, Agent, or Firm*—Merchant & Gould P.C.

(57) ABSTRACT

A system for transmitting and registering calls for assistance includes a plurality of call boxes, a central processor for receiving calls for assistance from the call boxes, and a plurality of portable radios capable of receiving paging messages from the central processor. At least one of the call boxes includes a frequency hopping spread spectrum transmitter for transmitting the calls for assistance, an actuator whereby a user can make a call for assistance, a voice message response device for providing a voice message, and a reset switch for resetting the call box. The central processor includes a transceiver for transmitting the paging messages, a receiver for receiving the calls for assistance, a memory and a processor. The plurality of portable radios may be carried by associates, whereby an associate may be notified of the call for assistance and report to the location. The voice message response device in the call box may verify to the user that the call for assistance has been transmitted, and may further instruct the user to remain at the call box until assistance arrives.

9 Claims, 4 Drawing Sheets

US 6,618,582 B1

CUSTOMER SERVICE SYSTEM WITH FEEDBACK AND METHOD FOR OPERATING

FIELD OF THE INVENTION

The present invention relates to systems whereby users can make calls for assistance and, more particularly, to a system for transmitting and registering calls for assistance.

BACKGROUND OF THE INVENTION

There are many situations in every day life where a user may wish to make a call for assistance. For example, in retail businesses which include a relatively large store area, the customers of the store may need assistance in a particular department. As another example, in a parking house facility, customers who park their cars may occasionally need to make calls for assistance, such as when their vehicle needs assistance. In airports, passengers may wish to make calls for assistance to get help with their luggage, etc. Furthermore, in a variety of situations, calls for assistance may be made for security reasons, such as fire or intruding persons.

Existing systems for transmitting calls for assistance generally suffer from one or more disadvantages. One disadvantage may be that the transmission of the calls for assistance is not sufficiently reliable. On the other hand, systems which may provide sufficient reliability of transmission, perhaps through hard wiring of various components in the system, may be relatively troublesome to install, particularly into an already operating facility, such as a retail business. Furthermore, some systems are disadvantageous in that they do not provide sufficient feedback to the user who makes the call for assistance. When a person makes a call for assistance, he or she is typically in need of attention because of one or more concerns. Since it may take a certain time to provide the desired attention to the person, it is important that the person is promptly and accurately informed about for example the actions taken, and given instructions about what to do next.

It is important that the system has high performance reliability, for example by continuous low battery alert functions and/or continuous monitoring of call stations. It is important that the system can operate in vast localities, for example by using repeaters which are easy to install. It is important that the system may provide for forwarding the calls for assistance, for example, to a pager.

SUMMARY OF THE INVENTION

The present invention relates to methods and apparatus for transmitting and registering calls for assistance. A system for transmitting and registering calls for assistance includes a plurality of call boxes, a central processor for receiving calls for assistance from the call boxes, and a plurality of portable radios capable of receiving paging messages from the central processor. At least one of the call boxes includes a frequency hopping spread spectrum transmitter for transmitting the calls for assistance, an actuator whereby a user can make a call for assistance, a voice message response device for providing a voice message, and a reset switch for resetting the call box. The central processor includes a transceiver for transmitting the paging messages, a receiver for receiving the calls for assistance, a memory and a controller. The plurality of portable radios may be carried by associates, whereby an associate may be notified of the call for assistance and report to the location.

In a preferred embodiment of the system, the voice message response device in the call box verifies to the user that the call for assistance has been transmitted, and further instructs the user to remain at the call box until assistance arrives.

A method of registering and transmitting calls for assistance includes providing a call box at a location, transmitting the call for assistance, receiving the call for assistance at a central processor, communicating a first voice message from the call box, and broadcasting a second voice message to at least one of the plurality of portable radios.

These and various other advantages and features of novelty which characterize the invention are pointed out with particularity in the claims annexed hereto and forming a part hereof. However, for a better understanding of the invention, its advantages, and the object obtained by its use, reference should be made to the accompanying drawings and descriptive matter which form a part hereof, and in which is illustrated and described preferred embodiments of the invention.

BRIEF DESCRIPTION OF THE DRAWINGS

In the drawings, wherein corresponding reference numerals generally indicate corresponding parts throughout the several views.

DETAILED DESCRIPTION OF THE DRAWINGS

Figure 1:
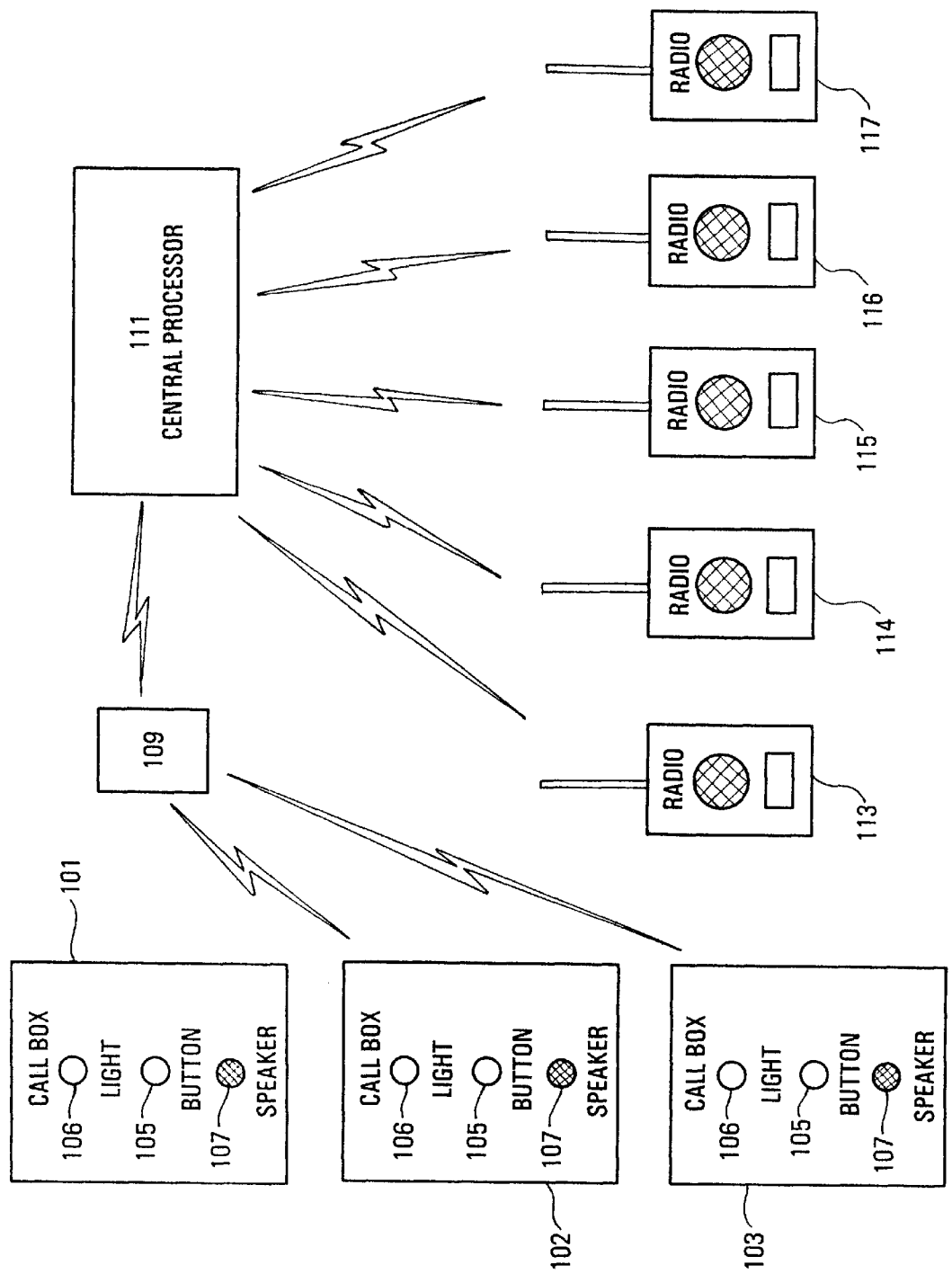
FIG. 1 is a block diagram schematically illustrating an embodiment of a system in accordance with the principles of the invention.

In FIG. 1, three call boxes 101–103 are shown. The call boxes 101–103 may be used to transmit calls for assistance to the central processor 111. Each call box includes a push button 105. The push button is accessible from outside the call box and a user may use the push button 105 to transmit a call for assistance. It is noted that fewer or more call boxes than the three shown in FIG. 1 may be used.

The call boxes 101–103 further include a light indicator 106 each. Many different well-known light indicators may be used with embodiments of the invention. For example, the light indicator 106 may be a LED. When the user transmits a call for assistance by using the actuator 105, the light indicator 106 is energized by the call box to indicate that the call for assistance is being transmitted. The call boxes 101–103 further include a speaker 107, for providing a voice message from the call box to the user. Many different voice messages may be used with embodiments of the invention. For example, the voice message may include an instruction for the user to remain at the location of the particular call box where the call for assistance was made.

When a user makes a call for assistance using the push button 105, the call for assistance is transmitted to the central processor 111. One or more repeaters 109 may be used to repeat the calls for assistance. Many different well-known repeaters may be used with embodiments of the invention. For example, the 900 MHz repeater manufactured by Inovonics Corporation under the product name FA525 may be used with embodiments of the invention. The repeater 109 may allow the calls for assistance to be retransmitted when, for example, the call boxes 101–103 are located far from the central processor 111. Also, the repeater 109 may facilitate retransmission of the calls for assistance when structural features such as walls, etc. would otherwise obstruct the transmission of the calls for assistance.

The central processor 111 receives the call for assistance and identifies which one of the call boxes 101–103 transmitted the call for assistance. The central processor 111 compiles a suitable paging message based on the received call for assistance. The paging message may, for example, include information on the location of the one of the call boxes 101–103 where the call for assistance was made. The central processor 111 will transmit the paging message to the portable radios 113–117. Associates which carry the portable radios 113–117, will receive the paging message from the central processor 111, and may report to the location of the call box, and assist the user. The portable radios 113–117 are two-way radio transceivers which are capable of transmitting and receiving radio signals including, for example, voice communication and receiving the paging messages from the central processor 111.

Figure 2:
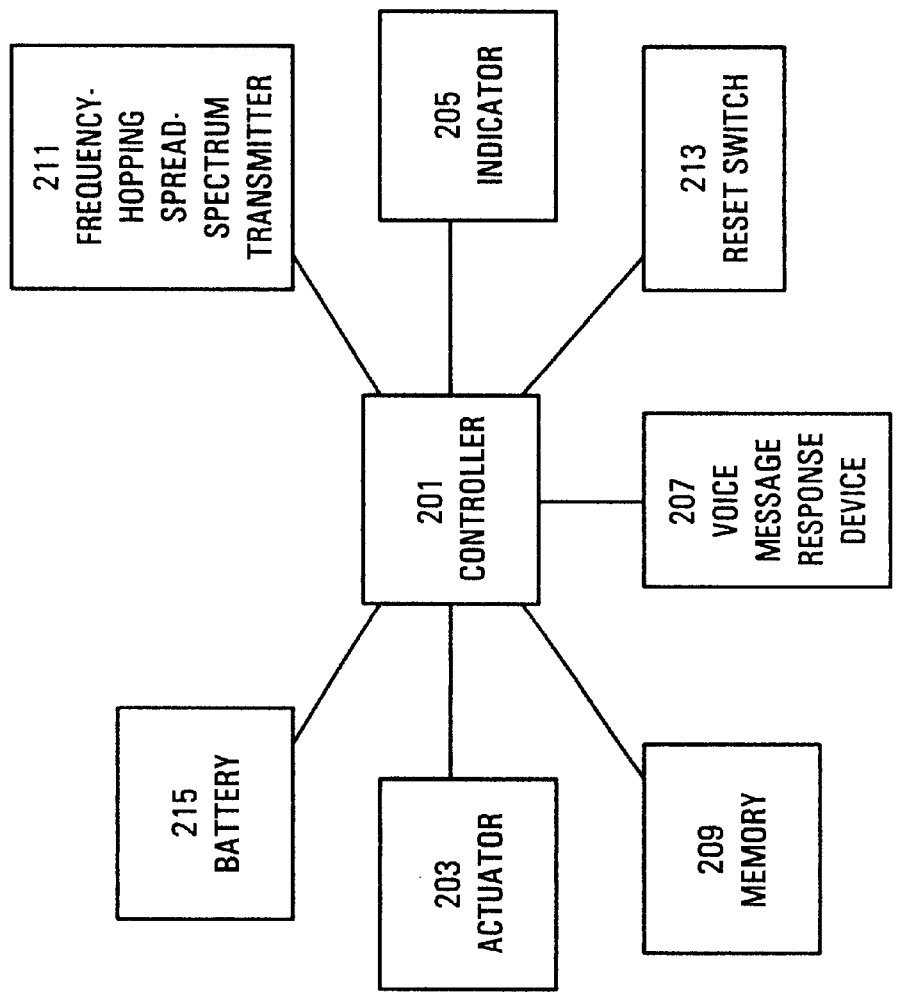
FIG. 2 is a block diagram schematically illustrating a call box in accordance with the principles of the invention.

The call boxes 101–103 will now be further described with reference also to FIG. 2. An exemplary call box is shown schematically in FIG. 2. The call box is operated by a controller 201. Many well-known controllers may be used with embodiments of the invention. The controller 201 includes logic and may carry out algorithms suitable for the particular application.

A user may make a call for assistance using the actuator 203. Many different actuators may be used with embodiments of the invention. For example, the actuator 203 may include the push button 105 accessible from outside the call box. The actuator 203 transmits a signal to the controller 201 indicating that a user is making a call for assistance. The controller 201 actuates the frequency hopping spread spectrum transmitter 211, which transmits the call for assistance. It is noted that the transmitter 211 includes all components necessary for transmitting, such as an antenna, etc. Different well-known frequency hopping spread spectrum transmitters may be used with embodiments of the invention. For example, 900 MHz transmitters manufactured by Inovonics Corporation under the product names FA210 and FA211 may be used.

The controller 201 actuates the indicator 205, which for example may include the light indicator 106, to provide an indication to the user that the call for assistance has been transmitted.

The controller 201 also actuates the voice message response device 207 to provide a voice message to the user in response to the call for assistance made by the user. The controller 201 obtains the voice message, for example from the memory 209. Many different well-known memories may be used with embodiments of the invention. The memory 209 is capable of storing at least one recorded voice message that may be output to the user through the voice message response device 207. The memory 209 may, for example, be a chip memory, in which a voice message can be recorded as is conventionally known.

When an associate reports to the location of the call box where the call for assistance was made, the associate may reset the call box using the reset switch 213. Different well-known reset switches may be used with embodiments of the invention. After the reset switch 213 is actuated, a new call for assistance may be made from the call box in accordance with the above. If a new call for assistance is made at the call box after the first call for assistance was made, but before the call box has been reset, the controller 201 may, for example, proceed as follows: the indicator 205 is actuated, the voice message response device 207 again transmits the voice message to the user, but the transmitter 211 does not transmit a new call for assistance. It is noted that in other embodiments the controller 201 may carry out other steps, or no steps, in response to a call for assistance made before the call box is reset.

The call box is powered by the battery 215. Many well-known batteries may be used. For example, the battery 215 may be adapted to cause the controller 201 to transmit a low battery alert when the battery 215 runs low. The low battery alert may be transmitted through the transmitter 211, and received by the central processor 11, where the situation may be detected by an operator.

Figure 3:
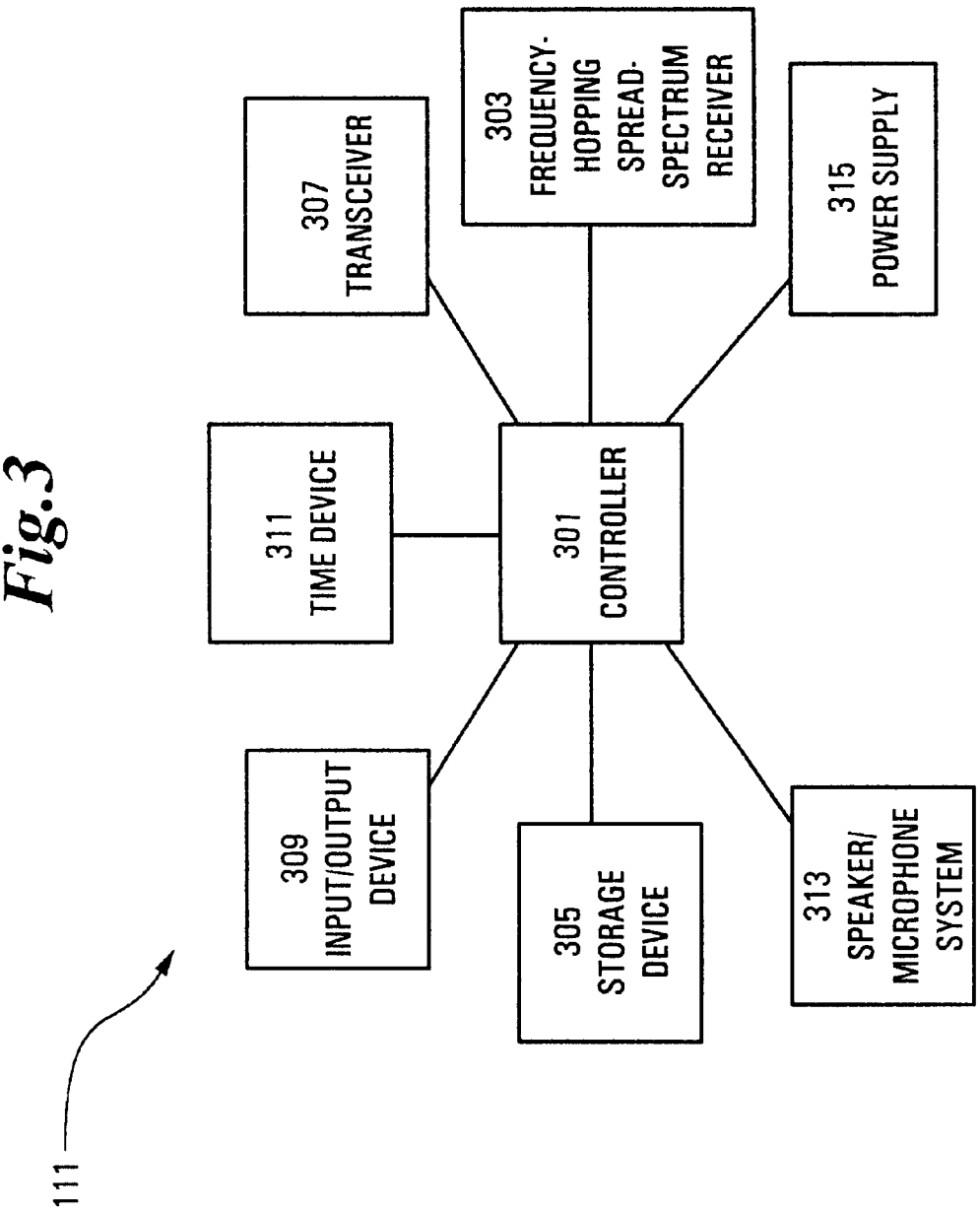
FIG. 3 is a block diagram schematically illustrating a central processor in accordance with the principles of the invention.

The central processor 111 will now be fturther described with reference also to FIG. 3. The central processor 111 includes a controller 301. The controller 301 includes logic and can carry out algorithms suitable for the application. The controller 301 is connected to a frequency hopping spread spectrum receiver 303 for receiving the calls for assistance from call boxes that are present in the system. It is noted that the receiver 303 includes all components necessary for receiving, such as an antenna, etc.

When a call for assistance is received by the receiver 303, the controller 301 accesses the storage device 305 in order to compile a paging message. Many different well-known storage devices may be used with embodiments of the invention. The storage device 305 is capable of storing a number of voice recordings, such that each voice recording is individually accessible by the controller 301. The storage device 305 is also capable of storing a log of events, such as calls for assistance. For example, the storage device 305 may store a start time, finish time, department location and/or other data regarding each particular call for assistance. It is noted that the storage device may consist of one or more units. For example, the storage device 305 may consist of a memory for storing a log, and chips for storing voice messages.

When the controller 301 receives a call for assistance through the transmitter 303, it determines which call box transmitted the call for assistance. Depending on the information in the call for assistance, the controller 301 accesses the storage device 305 to obtain the suitable voice recordings. The controller 301 will compile a paging message from one or more voice recordings in the storage device 305, and-transmit the paging message through the transceiver 307. For example, voice recordings such as "nine", "aisle", and "guest assistance needed in" may be compiled by the controller 301 to provide the paging message "guest assistance needed in aisle 9". The paging messages are transmitted by the transceiver 307 to be received, for example, by the portable radios 113–117 that may be carried by associates.

Different well-known transceivers may be used with embodiments of the invention. The transceiver is capable of transmitting and receiving signals to and from the portable radios 113–117. It is noted that the transceiver 307 includes all components necessary for transmitting and receiving, such as antennas, etc. The transceiver 307 may initially verify that a channel is clear prior to transmitting the paging message, by using a receiver function.

When the call for assistance is received at the central processor 111, the time device 311 registers a start time. When the call box from which the call for assistance was transmitted is reset, the time device 311 registers a finish time. The start time and the finish time may be stored for later evaluation. The start and finish times may, for example, be stored in the storage device 305.

The input/output device 309 may be used to output diagnostic information regarding the central processor 111. The input/output device 309 may, as another example, be used to input information to the central processor 111. For example, programming steps may be added, changed or deleted in the central processor 111. Furthermore, voice recordings may be brought to the central processor 111 through the input/output device 309.

Well-known input/output devices may be used with embodiments of the invention. For example, the input/output device 309 may include a modem and/or telephone line. When the input/output device 309 is used, information stored regarding the start and finish time of one or more calls for assistance may be output to an operator of the system. The stored log of start and finish times may for example be evaluated to determine the rate at which assistance arrives after a call for assistance is made.

The central processor 111 may periodically monitor the call boxes to verify that they still are in operation. For example, the call boxes may periodically transmit a supervisory central message to the central processor 111. If the call box does not transmit its supervisory control message within the expected time period, the central processor 111 will register that the call box is not operating. The central processor 111 may, for example, output the information regarding the call box through the input/output device 309, whereby an operator may notice the situation.

The central processor 111 may further include a speaker/microphone system 313, connected to the controller 301. The speaker/microphone system 313 may for example be used to record paging messages in the central processor 111. The operator recording the messages may read the messages into the microphone for recording. The speaker may be used for listening to recorded messages. Many different microphones and speakers may be used in the speaker/microphone system 313. For example, a conventional speaker and a conventional microphone may be used.

The central processor 111 further includes a power supply 315. Many different power supplies may be used with embodiments of the invention. For example, the power supply 315 may be a battery or a connection to a power outlet. The power supply 315 may optionally be capable of providing backup power if the regular mode power distribution fails, as is conventionally known.

Figure 4:
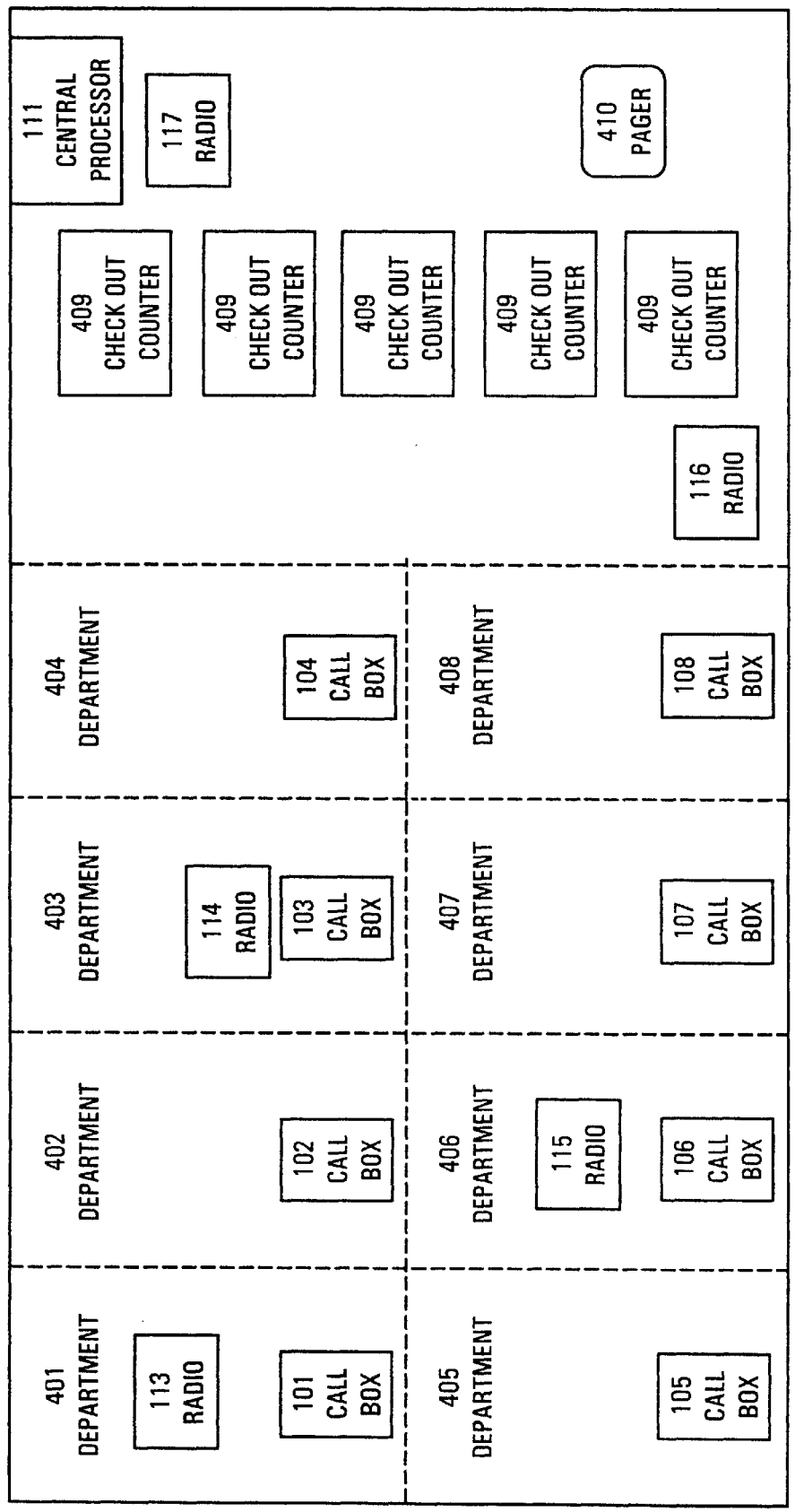
FIG. 4 is a block diagram schematically illustrating a floor plan of a retail business facility where a system in accordance with the principles of the invention may be used.

An exemplary use of the invention will now be described with reference also to FIG. 4. A floor plan of a retail business facility 400 is schematically shown. The retail business facility 400 includes departments 401–408, characterized for example by containing different categories of merchandise. Call boxes 101–108, substantially as described above, are located throughout the departments 401–408, such that each department has one call box. It is noted that other configurations of the departments and/or the call boxes are possible. The call boxes 101–108 are positioned at places where customers of the retail business facility 400 are likely to need assistance. The call boxes 101–108 are typically provided with information signs or labels indicating to the customers that the call box can be used to make a call for assistance. Associates of the retail business facility 400 are carrying the portable radios 113–117, which portable radios are illustrated at various locations in the facility 400.

The central processor 111 is schematically illustrated as a box mounted on a wall of the retail business facility 400. It is noted that the exact location of the central processor 111 may be chosen in consideration of the particular circumstances of the application. A number of check-out counters 409 are schematically illustrated toward one end of the retail business facility 400. It is noted that the call boxes 101–108 may be placed at suitable locations throughout the facility 400, for example including the area where the check-out counters 409 are located.

In this example, we assume that a call for assistance is made at the call box 104 in department 404. The call for assistance is transmitted from the call box 104 to the central processor 111. As noted above, a repeater (not shown) may repeat the call for assistance between the call box and the central processor. When the central processor 111 receives the call for assistance, it determines from which call box the call was made, and compiles a paging message, for example including the department number 404 or an equivalent name.

Upon transmitting the call for assistance, the call box 104 may, for example, energize a light indicator and provide a voice message to the customer who made the call for assistance. The voice message may include instructions to the customer, such as instructions to remain at the location of the call box 104.

The central processor 111 transmits the paging message to the portable radios 113–117. The associates of the facility 400 may hear the paging message through their respective portable radios. If an associate reports to the call box 104, he or she may reset the call box using the reset switch 213. If the call box has not been reset within a predetermined time, the central processor 111 may take further steps. For example, the central processor 111 may transmit a message to a pager 410. Many different well-known pagers may be used with embodiments of the invention. For example, a conventional pager may be used, whereby the central processor 111 may transmit a regular paging phone call to reach the pager 410. A manager or equivalent may wear the pager 410 to be informed when a call for assistance has not been reset within the predetermined time. Also, the call box may be automatically reset if it has not been manually reset within a time limit.

Although the invention has been described with respect to preferred embodiments thereof, it is to be understood that it is not so limited since changes and modifications can be made therein which are within the full intended scope of this invention as defined by the broad general meaning of the wording in the appended claims.

We claim:

1. A method for operating a customer service system in a retail business facility having a plurality of departments, the method including:

providing a call box at a location in a department of the retail facility where customers may make calls for assistance by activating the call box;

sending a signal to a call box controller located within the call box;

sending a call for assistance from the call box to a central controller;

accessing a first voice message from memory located at the call box, the first voice message being accessed by the call box controller in response to the signal, and the first voice message instructing the customer to stay at the location of the call box;

communicating the first voice message from the call box to the customer, instructing the customer to stay at the location of the call box;

receiving the call for assistance at the central controller;

accessing a second voice message from memory located at the central controller, the second voice message identifying a location of the call box where the call for assistance originated; and broadcasting the second voice message at at least one of a plurality of portable radios.

2. The method of claim 1, further including the step of recording the first voice message in the call box.

3. The method of claim 1, further including the step of compiling the second voice message at the central controller prior to broadcasting.

4. The method of claim 3, wherein the step of compiling the second voice message includes forming the second voice message by combining a plurality of separate voice recordings stored in the central controller.

5. The method of claim 1, further including the step of transmitting a message to a pager.

6. The method of claim 1, further including the step of registering at the central controller a start time when the call for assistance was received, and a finish time when an associate resets the call for assistance.

7. The method of claim 6, further including the step of storing the start and finish times in a memory.

8. The method of claim 1, further including the step of automatically resetting the call box if the call box is not manually reset within a predetermined time.

9. A communication system comprising:

A. a plurality of call boxes located at a plurality of locations where users may need to send calls for assistance, each call box including:

a. first memory located at the call box for storing a first voice message that instructs the users to remain at the location of the call box;

b. a speaker provided at the call box;

c. an actuator provided at the call box;

d. a first controller provided at the call box that interfaces with the actuator such that when the actuator is actuated, the first controller accesses the first voice message from the first memory and causes the first voice message to be broadcast over the speaker provided at the call box;

B. a central control system that interfaces with the call boxes, the central control system including:

a. a second controller located distant from the call boxes;

b. second memory for storing verbal words;

c. a transmitter that interfaces with the second controller, wherein when a selected one of the call boxes is actuated, the second controller is signaled by the selected call box to access the second memory and cause a second voice message that identifies the selected call box to be transmitted by the transmitter; and C. at least one portable radio for receiving the second voice message, whereby an associate carrying the portable radio is notified by the second voice message that assistance is needed at the selected call box.

* * * * *

UNITED STATES PATENT AND TRADEMARK OFFICE
CERTIFICATE OF CORRECTION

PATENT NO. : 6,618,582 B1
DATED : September 9, 2003
INVENTOR(S) : Coons et al.

It is certified that error appears in the above-identified patent and that said Letters Patent is hereby corrected as shown below:

Column 4,
Line 16, "processor 11," should read -- processor 111, --
Line 18, "be fturther" should read -- be further --
Line 50, "and-transmit" should read -- and transmit --

Signed and Sealed this

Thirty-first Day of August, 2004

JON W. DUDAS
*Director of the United States Patent and Trademark Office*